(12) United States Patent
Lettkeman et al.

(10) Patent No.: US 8,343,273 B1
(45) Date of Patent: Jan. 1, 2013

(54) METHOD OF MODIFYING BETA STUCCO USING DIETHYLENE-TRIAMINE-PENTAACETIC ACID

(75) Inventors: Dennis M. Lettkeman, Watonga, OK (US); Raymond A. Kaligian, II, Geneva, IL (US); Michael L. Cloud, Canton, OK (US); John W. Wilson, Fairview, OK (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 13/435,781

(22) Filed: Mar. 30, 2012

(51) Int. Cl.
*C04B 11/00* (2006.01)
(52) U.S. Cl. .................. 106/778; 427/372.2; 427/384
(58) Field of Classification Search .................. 106/778; 427/372.2, 384
See application file for complete search history.

(56) References Cited

U.S. PATENT DOCUMENTS

| | | | |
|---|---|---|---|
| 3,304,189 A * | 2/1967 | Kuntze | 106/651 |
| 4,252,568 A | 2/1981 | Bounini | |
| 4,366,209 A | 12/1982 | Babcock | |
| 4,488,910 A | 12/1984 | Nicholson et al. | |
| 4,661,161 A * | 4/1987 | Jakacki et al. | 106/648 |
| 4,681,644 A | 7/1987 | Dozsa | |
| 5,223,029 A | 6/1993 | Oonishi et al. | |
| 5,629,361 A | 5/1997 | Nakabayashi et al. | |
| 5,658,624 A | 8/1997 | Anderson et al. | |
| 5,695,553 A | 12/1997 | Claret et al. | |
| 6,468,632 B2 | 10/2002 | Winkowski | |
| 6,632,550 B1 | 10/2003 | Yu et al. | |
| 6,800,361 B2 | 10/2004 | Bruce et al. | |
| 6,822,033 B2 | 11/2004 | Yu et al. | |
| 7,588,634 B2 * | 9/2009 | Lynn et al. | 106/772 |
| 7,754,006 B2 * | 7/2010 | Liu et al. | 106/778 |
| 7,824,490 B2 * | 11/2010 | Bruce et al. | 106/772 |
| 7,875,114 B2 * | 1/2011 | Wittbold et al. | 106/772 |
| 8,088,218 B2 * | 1/2012 | Blackburn et al. | 106/772 |
| 2002/0045074 A1 | 4/2002 | Yu et al. | |
| 2010/0062255 A1 * | 3/2010 | Aksela et al. | 428/402 |

* cited by examiner

*Primary Examiner* — Anthony J Green
(74) *Attorney, Agent, or Firm* — Greer, Burns & Crain, Ltd.; Pradip Sahu; Philip T. Petti

(57) ABSTRACT

A method for preparing a modified beta-stucco from calcined natural rock gypsum that includes preparing a solution of liquid diethylene-triamine-pentaacetic acid in water, applying the solution onto beta-stucco while hot from the calciner, forming a wetted beta-stucco, and allowing the wetted stucco to dry and heal, forming the modified beta-stucco.

11 Claims, No Drawings

METHOD OF MODIFYING BETA STUCCO USING DIETHYLENE-TRIAMINE-PENTAACETIC ACID

FIELD OF THE INVENTION

This invention relates to a method of coating stucco with a diethylene-triamine-pentaacetic acid ("DTPA"). More specifically, a modified beta stucco is provided by spraying an aqueous solution of DTPA onto beta-stucco and allowing it to dry, thereby providing a modified beta-stucco material.

BACKGROUND

Gypsum is also known as calcium sulfate dihydrate, terra alba or landplaster. Calcined gypsum is obtained by removing part of the water associated with the gypsum crystal. Synonymous terms for calcined gypsum are Plaster of Paris, stucco, calcium sulfate half-hydrate and calcium sulfate hemihydrate. Calcined gypsum, stucco and hemihydrate are the most commonly used terms, and they are used interchangeably in this application. When gypsum is mined, the natural rock is found in the dihydrate form, having about two water molecules associated with each molecule of calcium sulfate. In order to produce the stucco form, the gypsum can be calcined to drive off some of the water of hydration represented by the following equation:

$$CaSO_4 \cdot 2H_2O \rightarrow CaSO_4 \cdot 1/2H_2O + 3/2H_2O$$

Calcium sulfate hemihydrate is obtained by calcination to remove the associated water molecules. The hemihydrate is produced in at least two crystal forms. Alpha-calcined gypsum is made by a slurry process or a lump rock process whereby the calcium sulfate dihydrate is calcined under pressure. The alpha-calcined gypsum forms less acicular crystals than beta-calcined gypsum, allowing the crystals to pack tightly together, making a denser and stronger plaster. The crystal morphology of alpha hemihydrate allows water to flow easily between the crystals, requiring less water to form a flowable slurry. More elongated irregular shaped crystals are characteristic of the beta-hemihydrate, which is obtained by calcining gypsum at atmospheric pressure. This crystal structure results in a less dense product because the crystals are more loosely packed. The beta form also requires more water to fluidize the calcined gypsum. If the calcining of the dihydrate is performed at ambient pressure, the beta form is obtained and the cost is relatively low compared to the alpha-calcined gypsum.

Synthetic gypsum, which is a byproduct of flue gas desulfurization processes from power plants, is also useful. Flue gas that includes sulfur dioxide is wet scrubbed with lime or limestone. Calcium from the lime combines with the sulfur dioxide to form calcium sulfite.

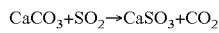

$$CaCO_3 + SO_2 \rightarrow CaSO_3 + CO_2$$

Via forced oxidation, the calcium sulfite is converted to calcium sulfate.

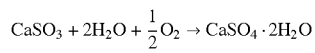

$$CaSO_3 + 2H_2O + \frac{1}{2}O_2 \rightarrow CaSO_4 \cdot 2H_2O$$

Synthetic gypsum is converted to a hemihydrate by calcination, described above.

A number of useful gypsum products can be made by mixing the calcium sulfate hemihydrate with water and shaping the resulting product slurry into the desired shape. The product slurry is permitted to set by allowing the calcium sulfate hemihydrate to react with sufficient water to convert the hemihydrate into a matrix of interlocking dihydrate crystals. As the matrix forms, the product slurry becomes firm and holds the desired shape. Excess water must then be removed from the product by drying.

Set accelerators and set retarders (collectively known as "set modifiers") are used in gypsum product compositions to allow control of the set time. If the set time is too long, contractors spend time waiting for the composition to set before they can move on to the next step of the project. When gypsum sets too quickly, the composition hardens before it is properly finished. In such cases, the surface may not be as smooth as desired or the product may not have been "worked" enough to produce a good finish.

Dry mixtures of calcium sulfate hemihydrate with additives are pre-blended and produced for the convenience of contractors and others who may not have knowledge of the need for additives or the amounts of additives that would be useful. The dry mixtures are designed to be mixed with water to produce a high quality composition that is easy to use. One example of a setting mixture is one that produces a flooring slurry when combined with water, such as LEVELROCK® gypsum flooring material.

Set accelerators are utilized to hasten setting of the slurry. Retarders are added to setting mixtures to increase the working time of the slurry. The working time, also known as the open time, is the time that the slurry is pliable and can be shaped into a desired configuration. In the flooring slurry, a target working time is one that is sufficiently long to allow the technician to adequately level the floor. Without a set retarder, a calcium sulfate hemihydrate (stucco) slurry has a working time that is often insufficient for professional finishers to produce a satisfactory floor. The set retarders extend the working time, depending on the composition being used, and where and how the slurry is being applied, so that the finisher has the time to work the slurry to make a high quality floor.

Conventionally, proteinaceous retarders, such as SUMA retarder, and non-proteinaceous retarders, such as cream of tartar (potassium bitartrate), sodium citrate and diethylene-triamine-pentacetic acid, are utilized in flooring and other gypsum-based setting compositions to provide set control. Suma retarder, commercially available as a dry powder additive, has disadvantages associated with its use, but no suitable replacement has been available. For example, SUMA has a strong and offensive odor. It is proteinaceous, and sourced from hair and hooves of various animals, such as horses. SUMA also has undesirable ageing characteristics. There is a long-standing need in the industry for a suitable replacement for this dry set retarder.

DTPAs are also well known as good set retarders, but the dry powdered forms have been found to be ineffective. For example, U.S. Pat. No. 4,661,161 to Jacacki ("Jacacki") teaches the addition of a liquid form of diethylenetriamine pentaacetic acid ("DTPA"). There is a need for a dry or powder component useful in setting mixtures that utilizes a DTPA as the set retarder that could be a suitable replacement for proteinaceous set retarders, such as SUMA. There is also a related need to improve the efficacy of liquid DTPA as a suitable set retarder.

There is also a need for a setting mixture that has good compressive strength. For example, gypsum products must be able to grip fasteners that penetrate the product or hold up to the pressures to which a floor is subjected.

Further there is a need for a setting mixture that requires less water to form a flowable slurry. Water is not always conveniently available at a job site. Use of reduced amounts of water also reduces the drying time of the product. Where the product is dried in an oven or kiln, the amount of fuel needed to dry the product can be reduced, realizing a savings in fuel cost.

SUMMARY

Improvements over conventional set retarders and known methods of using liquid DTPA are realized by the present invention whereby beta-stucco (also known as beta-calcined gypsum or beta-calcium sulfate hemihydrate) is sprayed with a solution of a DTPA and allowed to dry, resulting in a modified beta-stucco. Slurries and products that utilize the present modified beta-stucco exhibit advantageous strength, density and water demand properties over slurries and products utilizing conventional stucco base materials. In addition, the set time of a slurry made with the presently modified beta-stucco is more predictable and more controllable. Surprisingly, liquid DTPA is found to be a suitable replacement for conventional set retarders, especially proteinacous set retarders such as SUMA. Modified beta-stucco, made according to the present method, provides good aging characteristics, leading to longer product shelf-life. The foul odor of conventional proteinaceous set retarder can be reduced or eliminated by reducing or eliminating the use of the conventional proteinaceous set retarder. In addition, a more uniform setting of slurries made with the presently modified beta-stucco can be achieved. Yet another advantage, associated with uniform setting, especially of a flooring material slurry, is reduced chalking of the surface.

A method for preparing the modified beta-stucco includes calcining calcium sulfate dihydrate at atmospheric pressure to make a beta-stucco (also known as beta-calcium sulfate hemihydrate). A solution of liquid diethylenetriamine-pentaacetic acid ("DTPA") in water is prepared. This solution is applied to hot beta-stucco as it exits the calciner at the rate of about 1.5 pounds to about 3.6 pounds DTPA per ton beta-stucco (about 0.75 kg to about 1.81 kg DTPA per metric ton beta-stucco). The beta-stucco treated in this way is wetted, then is allowed to dry and heal, forming the modified beta-stucco.

The present modified beta-stucco has several advantages, as described above, and it can be used in conjunction with conventional set inhibitors and rheology modifiers, as well as other additives commonly found in dry stucco-based mixtures, such as defoamer, dispersants, and others. When used to make such products, the modified beta-stucco moves through conveyors and bin systems without substantial concern for rehydration and/or lumping. If equipment becomes wet, hydration reactions are initiated when conventional stuccos later come in contact with the moisture. Addition of the DTPA set inhibitor allows the stucco to be dried without setting. Additionally, the modified beta-stucco can be packaged more quickly with less lump formation in the packaged material.

DETAILED DESCRIPTION

At least one of these and other advantages are provided by the present invention that describes a method for preparing a modified beta-stucco. The modified beta-stucco is sufficiently powerful to provide a more controllable and predictable set time to alpha and beta calcium sulfate hemi-hydrates or combinations such that the resultant material can be used as a new and improved stucco base material or as a pre-blend additive for dry mixes or slurries of various products or systems.

Liquid diethylenetriamine-pentaacetic acid ("DTPA") DTPA, such as NOGO™ Hydration Inhibitor (United States Gypsum Company, Chicago, Ill.) DTPA or VERSENEX 80® (UNIVAR, Oklahoma City, Okla.) DTPA has unexpectedly been found to improve several features of gypsum-based settable compositions. When mixed with water and applied to freshly calcined, hot beta-stucco material in the present method, liquid DTPA remains on the dried modified beta-stucco after the water evaporates. Modifying the beta-stucco this way provides a beta-stucco base material that demonstrates improved wet and dry densities as well as 1 hour and dry composition compressive strengths of products made by otherwise conventional methods with slurries of the modified beta-stucco. Additionally, the water demand of a slurry made with the present modified beta-stucco was significantly reduced. All of these improvements are unexpected, as DTPA is previously known only as a set retarding additive when added as a liquid to the slurry mixing water. It is now discovered that by applying liquid DTPA to beta-stucco and allowing it to dry, the modified beta-stucco that results may replace conventional base stucco material and no other set retarders may be required in the slurry. Although no other retarders are necessary, conventional set retarders may optionally be added to the slurry. These advantages are in addition to the improved set time control and predictability described above.

Calcium sulfate hemihydrate ("stucco"), beta form, is obtained as the starting material for the present process. The beta-stucco is obtained by mining of natural gypsum rock, or calcium sulfate dihydrate (also known as gypsum or landplaster), which is then calcined in an open kettle or any calcining process at atmospheric pressure.

An exemplary process for manufacturing kettle stucco will now be described, although methods of calcining, other than kettle, are known in the art. For example, calcination is also achieved in a flash calciner or a refractoryless kettle. Natural rock gypsum (calcium sulfate dihydrate) is mined, resulting in a collection of gypsum rocks ranging in size from about 2" diameter chunks to dust. The sized rock is processed, for example, through a RAYMOND Roller mill/Williams Mill or equivalent, to further process the rock into landplaster. The landplaster, which is generally fine enough such that 90-100% passes through a 100% mesh sieve, is conveyed into a 10 foot conventional plaster kettle. The landplaster is cooked via heat from below where the firebox is generally about 2000° F. (about 1090° C.), which heats the gypsum and removes about % of the chemically combined water, forming beta-hemidyrate. Stucco, moulding, kettle stucco and casting plaster are all common names for the resultant material.

A solution of the liquid diethylene-triamine-pentaacetic acid ("DTPA") is prepared for use. Tests were done in attempts to find a suitable replacement for known dry, powder set-controlling additives, such as proteinaceous set retarders. Because liquid DTPA has previously been used as an additive to mixing water of a slurry, the dry powder DTPA was tested as a possibly suitable substitute for the proteinaceous additive. However, powdered forms of DTPA were found to be ineffective substitutes for SUMA or other powder set retarders. In the present method, liquid DTPA is added to water for the purpose of making a solution of increased volume for application to beta-calcined gypsum before a slurry is made. The water is a volumizer, which aids in application of a small amount of DTPA to a large amount of beta-stucco. The water evaporates, and it is contemplated that the DTPA could be applied directly. The modified beta-stucco (hemihydrate or calcined gypsum) is provided as a carrier of dry DTPA set retarder and it is contemplated that the modified beta-stucco is combined with conventional base stucco material before the stucco is mixed with water and other additives known in the art to make a slurry and shape products therefrom.

The aqueous solution of DTPA is applied to the hot beta-stucco as, or shortly after, exiting the calciner using any suitable apparatus. By "hot," we mean that the beta-stucco is at least about 120° F. (about 49° C.) when the solution is applied thereon. Preferably, the temperature of the calcined stucco is from about 240° F. to about 340° F. (about 115° C. to about 171° C.) during solution application. In some stucco plants, facilities are present to spray the stucco with the DTPA solution to disperse it evenly over the calcined gypsum. An example of such apparatus is a post stucco treatment system ("PST"), a fluidized bed stucco treatment chamber ("FST") that was originally designed to cool stucco as it exits the calciner and has been determined to provide a unique method of uniformly applying the aqueous solution to the beta-stucco material. Although the following is a description of the stucco treatment in terms of the PST or FST system, it is not intended to be limiting and those skilled in the art would readily determine other ways of treating stucco with the liquid DTPA.

From the kettle, the calcined gypsum material flows through a pipe to the next stage of processing. This is called "overflow", and the temperature of the overflow may range from about 285 to about 340° F. (about 140 to about 171° C.). Thus, this is the temperature of the stucco when it enters the PST/FST, or other, post stucco treatment apparatus. Alternatively, the material could be stored in a hot storage area, such as a hotpit or a bin, prior to entering the next treatment stage. In the present method, the fluidized bed stucco treatment ("FST") apparatus is optionally modified to provide the post stucco treatment. A large treatment vessel receives stucco directly from the calcining kettle or the hot storage area that may be utilized. The treatment vessel is cylindrical or any other shape conducive to treating stucco, especially freshly calcined or hot stucco. Optionally, stucco is received at a top portion of the treatment vessel where it is agitated by an agitator and allowed to traverse the vessel, preferably by descending to the bottom of the treatment vessel. Along the way, there is at least one spraying apparatus on at least one side of the vessel.

This treater assembly includes an air chamber that is pressurized to create a differential of between about 2 psi to about 10 psi across the fluidized bed. Optionally, the treatment vessel includes a fluidized bed at a bottom of the treatment vessel so the air chamber is pressurized. As a result of the pressure, the beta-stucco material is slowed down as it traverses or descends past the sprayer, giving the beta-stucco a better chance of being sufficiently coated with the water composition being sprayed. Advantageously, there is no need to tumble the beta-stucco as it moves through the treater apparatus. This apparatus is referred to as the PST/FST treater or chamber. The hot and pre-treated stucco enters the apparatus at an upper or top portion and descends to a lower or bottom portion. The rate of descent is reduced by a fluidized bed included in the bottom portion of the chamber.

In the present method, the PST/FST apparatus is modified to spray a combination of water and a chemical treatment. The chemical, as described elsewhere in this application, is liquid DTPA. The beta-stucco (beta-hemihydrate) material enters the PST/FST treater at a rate of, for example, about 8 to about 11 ton/hr (about 7,260 to about 9,980 kg/hr), but the method is not limited to this flow rate. The temperature of the material, whether entering directly as overflow from the kettle or from storage, ranges from about 285 to about 340° F. (about 140 to about 171° C.), the same as the exit temperature from the calciner.

As described above, the present PST/FST apparatus includes the agitator. Optionally, the agitator is rake shaped, though other shapes may be known and appreciated. Optionally rotating at about 10-200 rpm, the agitator reduces channeling of the deep fluidized bed, known as worm holes, so that the particles continue to bounce until treated with water or the water and chemical blend. The agitator speed is not significant, and other speeds of agitations are contemplated.

Leaving the PST/FST treatment apparatus, the temperature of the material is about 180 to about 300° F. (about 82 to about 148° C.), depending on the level of water and chemical composition sprayed and the material temperature upon entry. It is desirable that the exiting material is kept moving at a controlled temperature (about 160 to about 300° F. or about 71 to about 148° C.) until healing of the wetted beta-stucco is complete. If the wetted beta-stucco is not kept moving there is potential for lumping and/or rehydration of the stucco which is undesirable.

It may be preferred to grind the treated beta-stucco to a finer size depending on the features and/or benefits needed. The preferred method is generally an entoleter impact mill. The sizing of the mill depends on the throughput rates of the material and the amount of grinding desired.

As described above, the present DTPA solution is suitably substituted for water for use in the PST/FST apparatus utilized in the present method. As the beta-stucco material falls through and/or is suspended within the shell of the treater apparatus, it is treated with a solution of water and NOGO™ Hydration Inhibitor DTPA (United States Gypsum Company, Chicago, Ill.) which is metered via conventional means. A MICROMOTION mass flow meter was used in the examples, but other flow meters are expected to work as well. Optionally, when liquid DTPA, such as NOGO™ is used, it is metered directly into the water rather than directly into the treater assembly due to the low volumes or quantities to be metered. Alternate spraying apparatuses are also contemplated. Quantities and rates of DTPA as applied during the present method are shown in Table 1 below. Generally, DTPA is applied at a rate of 0.25-0.67 lbs./min. This translates to about 1.5 to about 3.6 lbs. of liquid DTPA per ton of beta-stucco (about 0.62 kg/metric ton to about 1.45 kg/metric ton).

The present method provides for wetting beta-stucco with the above-described solution of water and NOGO™ Hydration Inhibitor DTPA, forming a wetted beta-stucco. It is most advantageous to spray the retarding agent solution onto the beta-calcined hemihydrate while it is still hot from the calcining process. If the beta-hemihydrate is sprayed with large amounts of water at temperatures below 212° F. (100° C.), hydration reactions are initiated and the hemihydrate reverts back to the dihydrate form. The wetted beta-stucco is formed at a rate of about 1.5 pounds to about 3.6 pounds DTPA per ton beta-stucco (about 0.62 kg to about 1.45 kg DTPA per metric ton beta-stucco).

The large volume of liquid facilitates spraying of the DTPA over a large volume of the calcined gypsum. The exact ratio of water to DTPA is not important as some excess water evaporates when it contacts the hot calcined gypsum. However, too much water released from the spraying apparatus can result in unacceptable lumping of the stucco. When lumps grow/aggregate/coagulate/beyond 38 mesh size, this is undesirable. Because water encourages lumping, no more than about 4 gallons (about 15 L) of water per minute is applied. The amount of water sprayed on the beta-stucco during the present method ranges from about 1 to about 4 gal/minute (about 3.78 to about 15 L/min). This corresponds to 3-10% by weight DTPA based on the weight of the beta-stucco passing through the treatment apparatus at a rate of about 10 tons/hr (about 9,072 kg/hr), which is the average output of a conventional 10 foot (about 3.08 m) diameter continuous calcining kettle, which ranges from about 9 to about 11 ton/hr (about 8,164 to about 9,980 kg/hr). The percentage of water by weight DTPA based on the weight of the beta-stucco passing through the treatment apparatus would not change if the weight changes.

Although too much water encourages lumping, and lumping is undesirable, a wide variation in the amount of water used is acceptable because excess water is evaporated by the hot stucco. It is important to balance the amount of water to achieve the dew point temperature, but limit lumping of the material. High temperature stucco coming out of the kettle, or other calciner, requires more water sprayed, as does stucco with a higher surface area, to reach a dew point temperature of the sprayed material. Spraying the water DTPA solution on the gypsum particles may cause some of them to stick together. If lumps of objectionable size are formed to achieve the dew point, they are optionally removed by grinding.

The DTPA is applied to the beta-hemihydrate in any convenient manner. One example of a method of spraying the DTPA solution onto the beta-hemihydrate is to move the beta-hemihydrate on a movable belt under one or more fixed spray heads. Alternately, the beta-hemihydrate could move in the same manner, but the spray heads could be movable, moving, for example, across the width of the belt. Another example of a manner for spraying the beta-hemihydrate is by fluidizing the hemihydrate particles in air and moving them past one or more sprayers. This is described in the present PST/FST apparatus. Other methods of distributing the DTPA set retarding agent solution over the beta-hemihydrate are known to those of ordinary skill in the art.

After the beta-stucco (beta-hemihydrate) has been dosed with the DTPA and water solution, it is dried. Water remaining in contact with the beta-hemihydrate as it cools is adsorbed by the beta-hemihydrate and converted to dihydrate gypsum. It is, therefore, advantageous to dry the treated beta-stucco in an oven or kiln to maintain it above temperatures of about 150° F. (about 65° C.) while it dries.

When the treated (or modified) beta-stucco (or beta-hemihydrate) is dried, it is optionally ground to achieve a more uniform particle size that is appropriate for the desired end use. This is generally unnecessary if the hemihydrate is from a synthetic gypsum source, rather than natural rock. Synthetic gypsum forms in small particles having a narrow particle size distribution compared to gypsum ground from natural rock. These properties are maintained to a large degree during the calcination process. When natural rock gypsum is ground, a wide particle size distribution is obtained. Kettle overflow landplaster from natural rock sources, before it is treated, will have a particle size distribution ranging from about 2 to about 420 μm.

The present modified beta-stucco provides an improved base stucco material for combination with dry additives such as defoamer, dispersant, and other components known in the art or other dry mixes of hemihydrate-based compositions, such as setting-type joint compounds, to improve the working time of the composition. Yet another advantage of the modified beta-stucco produced by the present method, the increased use of NOGO™ Hydration Inhibitor DTPA in the PST/FST treatment system water was found to reduce the machine mix acceleration of the set time versus the low energy of hand mixing. The untreated stucco demonstrates a machine mix which is about ½ of that of the hand mix. The use of water only reduces the acceleration under machine mix to 36% of the hand mix. While a slight addition of about 0.1 lb/min (about 45 g/min) of NOGO™ Hydration Inhibitor DTPA to the treatment water maintained the 36% acceleration level, increased levels of about 0.25 lbs. (about 113 g), about 0.5 lbs. (about 227 g) and about 0.67 lbs. (about 304 g) per minute reduced the impact of higher energy acceleration to about 33%, about 28% and about 0.22% respectively.

This unexpected improvement in reduction of acceleration under machine mixing by the use of this stucco treatment system will be appreciated by those familiar with industrial applications where machine mixing is the norm. This includes gypsum flooring applications, oil well cements, pottery plasters, statuary and sanitary applications as well as others.

The reduction of the acceleration under higher energy mixing also lends the stucco to have longer working times which allows for prevention of material setting up in the equipment, longer pouring times with less clean outs and longer lasting equipment. In systems such as gypsum flooring where Rochelle Salts are used as the preferred set inhibitor to provide for uniform setting of the floor and resistance to acceleration of machine mixing or accelerative sands, the use of the present treatment system would be helpful in reducing the acceleration without the negative impact of reduced strengths due to presence of the salts.

Further, the increased amount of the set inhibitor in the treater water is expected to result in less lumping of the treated stucco in the system and bins as it is conveyed and dried. This will be expected to improve the uniformity of the resultant material in use.

The Examples below demonstrate aspects of the present stucco treatment system.

TABLE 1

| Stucco Type | Water Treatment Level | NOGO Treatment Level (#/min) | Normal Consistency (cc) | Hand Mix Vicat Set (min) | HOBART MIX VICAT SET (min) | WET DENSITY (#/ft3) | 1 HR Comp. Strengths (psi) | DRY DENSITY (#/ft³) | DRY Comp. Strength (psi) |
|---|---|---|---|---|---|---|---|---|---|
| OVERFLOW no PST/FST no NOGO ™ | 0 gal/min | 0 | 81.00 | 25.50 | 12.00 | 96.54 | 616.5 | 63.07 | 1742 |
| PST/FST Water Only | 2.0 gal/min | 0 | 69.33 | 10.83 | 6.83 | 98.32 | 964 | 67.41 | 2481.8 |
| PST/FST Water and NOGO ™ | 2.0 gal/min | 0.1 | 61.00 | 19.00 | 12.00 | 102.63 | 1217 | 74.68 | 2933 |
| PST/FST Water and NOGO ™ | 2.0 gal/min | 0.25 | 61.42 | 20.57 | 13.78 | 102.74 | 1226 | 74.98 | 3021.57 |

TABLE 1-continued

| Stucco Type | Water Treatment Level | NOGO Treatment Level (#/min) | Normal Consistency (cc) | Hand Mix Vicat Set (min) | HOBART MIX VICAT SET (min) | WET DENSITY (#/ft3) | 1 HR Comp. Strengths (psi) | DRY DENSITY (#/ft$^3$) | DRY Comp. Strength (psi) |
|---|---|---|---|---|---|---|---|---|---|
| PST/FST Water and NOGO ™ | 2.0 gal/min | 0.5 | 60.00 | 42 | 30 | 105.76 | 1500 | 77.7 | 3650 |
| PST/FST Water and NOGO ™ | 2.0 gal/min | 0.67 | 60 | 79 | 61 | 106.86 | 1375 | 79.59 | 3325 |

For samples shown in Table 1, the overflow rate of the kettle was constant at about 10 tons per hour, and the overflow temperature was about 315° F. Upon exit from the PST/FST apparatus, the treated stucco temperatures were about 198-210° F. (92-99° C.).

While the PST/FST treatment of stucco with water only was expected to reduce the water demand as reported as the normal consistency of the stucco, it is unexpected that the addition of NOGO™ liquid DTPA to the water for treatment at various levels would further reduce the water demand as the NOGO™ DTPA is conventionally utilized as a set inhibitor/retarder in plaster slurry systems. Surprisingly, NOGO™ Hydration Inhibitor (DTPA) in the present stucco treatment reduced the water demand (consistency as shown in Table 1) substantially within the useful range of about 0.1 to 0.67 pounds per minute (about 0.75 to about 5.1 grams/second).

The unexpectedly lower water demands as a result of the use of the present stucco treatment would allow replacement of more costly alpha hemihydrate with beta hemihydrate. In addition, known formulations for settable gypsum slurries could be improved by reducing the amount of polycarboxylate dispersant required. These dispersants are expensive, and as the polycarboxylate levels increase beyond a certain concentration the strength of the final product tends to be reduced. This can be avoided by utilizing stucco prepared according to the present treatment method and system as the base material for settable slurries.

Yet another advantage of the present stucco treatment system is that the set time of the resulting slurry is more controllable and predictable over results achieved by adding conventional set retarders to the slurry water, not on the stucco directly during post stucco treatment.

With respect to the densities and compressive strength, increasing dosages of NOGO™ Hydration Inhibitor DTPA to the PST/FST treatment water were found to unexpectedly reduce the surface tension of the slurry at higher degrees such that the slurry densities (wet and dry) were higher at each higher dosage. Also, the 1 hour and dry compressive strengths were surprisingly higher at each higher dosage rate, up to the about 0.5 lbs./min (about 3.8 g/s) rate. A drop in compressive strength was determined at the about 0.67 lb/min (about 5.1 g/s) level indicating the 0.5 lb/min (3.8 g/s) rate to be near optimum. The about 0.67 lb/min (about 5.1 g/s) level did continue to show higher compressive strengths than the levels lower than about 0.5 lb/min (about 3.8 g/s). This is believed to be a result of reduction in the surface tension which was measured in the wet and dry densities which increased as well as the reflection in the higher compressive strengths at both the 1 hour point and when the samples were allowed to dry to constant weight in a 110° F. (43° C.) forced air oven.

TABLE 2

| Stucco Type | Test Period | Water Treatment Level | NOGO ™ addition (#/min) | Normal Consistency (cc) | Hand Mix Vicat Set (min) | Total Dispersed Consistency (cc) |
|---|---|---|---|---|---|---|
| NOGO PST/FST STUCCO | Initial Sep. 21, 2010 | 2.0 gal/min | 0.25 | 68 | 51 | 80 |
| NOGO PST/FST STUCCO | 3 wk Oct. 12, 2010 | 2.0 gal/min | 0.25 | 68 | 52 | 80 |
| NOGO PST/FST STUCCO | 7 wk Nov. 12, 2010 | 2.0 gal/min | 0.25 | 68 | 48 | — |
| NOGO PST/FST STUCCO | 11 wk Dec. 15, 2010 | 2.0 gal/min | 0.25 | 69 | 48 | — |
| NOGO PST/FST STUCCO | 19 wk Feb. 17, 2010 | 2.0 gal/min | 0.25 | 68 | 48 | — |
| NOGO PST/FST STUCCO | 23 wk Mar. 15, 2010 | 2.0 gal/min | 0.25 | 69 | 49.5 | — |
| NOGO PST/FST STUCCO | 27 wk Apr. 12, 2010 | 2.0 gal/min | 0.25 | 69 | 48.5 | — |
| NOGO PST/FST STUCCO | 31 wk May. 16, 2010 | 2.0 gal/min | 0.25 | 69 | 48 | — |
| NOGO PST/FST STUCCO | 35 wk Jun. 14, 2010 | 2.0 gal/min | 0.25 | 69 | 52 | 81 |
| NOGO | 39 wk | 2.0 | 0.25 | 69 | 54 | 80 |

TABLE 2-continued

| Stucco Type | Test Period | Water Treatment Level | NOGO ™ addition (#/min) | Normal Consistency (cc) | Hand Mix Vicat Set (min) | Total Dispersed Consistency (cc) |
|---|---|---|---|---|---|---|
| PST/FST STUCCO | Jul. 14, 2010 | gal/min | | | | |
| NOGO PST/FST STUCCO | 43 wk Aug. 18, 2010 | 2.0 gal/min | 0.25 | 69 | 48 | 81 |

Stucco was treated according to the present method and prepared for testing to evaluate how well the product ages. The landplaster source for the calcining kettle was from United States Gypsum Company natural lump rock, locally sourced from Southard, Okla. The overflow rate of the calcining kettle was about 10 tons per hour with the overflow temperature of 315° F. (157° C.). The stucco was PST/FST treated with water and NOGO™ Hydration Inhibitor DTPA at the various dilutions as shown. This table shows that the present method provides a uniquely stable stucco base material, useful as a delivery vehicle for set retarder into a gypsum slurry. The consistency (water demand) and vicat sets remain stable over a period of 43 weeks, as shown. While some variation occurred in the testing of the dispersed consistency, the improved resistance to dispersion under high energy was maintained.

For examples tabulated in Table 2, a pallet of bags of the treated stucco was set aside. No additives were used in packing the bags. A new bag was cut open for testing t the intervals listed. Samples were extracted from the middle of the bag for immediate testing each time.

While particular embodiments of the present method for preparing a modified beta-stucco have been shown and described, it will be appreciated by those skilled in the art that changes and modifications may be made thereto without departing from the invention in its broader aspects and as set forth in the following claims.

What is claimed is:

1. A method for preparing a modified beta-stucco from calcined natural rock gypsum comprising:
    preparing a solution of liquid diethylene-triamine-pentaacetic acid in water;
    applying the solution onto said beta-stucco while hot from the calciner, forming a wetted stucco; and
    allowing the wetted stucco to dry and heal, forming the modified beta-stucco.

2. The method of claim 1 wherein the solution is applied at a rate of about 1.5 pounds to about 3.6 pounds DTPA per ton of beta-stucco (about 0.62 kg to about 1.45 kg DTPA per metric ton of beta-stucco).

3. The method of claim 1 further comprising grinding the modified beta-stucco.

4. The method of claim 1 further comprising fluidizing the beta-stucco prior to said applying step.

5. A method of claim 1 wherein said applying step further comprises:
    receiving beta-stucco at a temperature between about 285 to about 340° F. (about 140 to about 171° C.) into a treatment vessel;
    providing a fluidized bed at a bottom of the treatment vessel so that an air chamber of the vessel is pressurized;
    allowing the beta-stucco to traverse the vessel;
    passing the beta-stucco across at least one sprayer for a water and DTPA solution;
    spraying the beta-stucco with the solution to provide the modified beta-stucco; and
    removing the modified beta-stucco from the treatment vessel.

6. The method of claim 5 further comprising agitating the beta-stucco as it enters the vessel with an agitator to prevent channeling of the fluidized bed.

7. The method of claim 5 wherein the beta-stucco is received into the treatment vessel at a top portion of the treatment vessel and allowed to traverse the vessel by descending to a bottom portion of the vessel.

8. The method of claim 6 wherein the descending beta-stucco is at least one of slowed down and suspended by the fluidized bed.

9. The method of claim 5 wherein the air chamber is pressurized to create a differential of about 2 psi to about 10 psi across the fluidized bed.

10. The method of claim 5 wherein the removing step further comprises removing the modified beta-stucco at a temperature between 160-300° F. (71-150° C.).

11. The method of claim 5 further comprising grinding the modified beta-stucco as it exits the treatment vessel.

* * * * *